(12) United States Patent
Qiu et al.

(10) Patent No.: US 11,195,246 B2
(45) Date of Patent: Dec. 7, 2021

(54) DELIVERY SYSTEM, SERVER, AND VEHICLE

(71) Applicant: TOYOTA JIDOSHA KABUSHIKI KAISHA, Toyota (JP)

(72) Inventors: Zekai Qiu, Nisshin (JP); Hironobu Kitaoka, Nisshin (JP); Naoki Yamamuro, Nagoya (JP); Kozo Kosho, Toyota (JP); Hiroaki Sugiyama, Nagoya (JP); Makoto Ikegami, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 16/165,589

(22) Filed: Oct. 19, 2018

(65) Prior Publication Data
US 2019/0122325 A1 Apr. 25, 2019

(30) Foreign Application Priority Data

Oct. 20, 2017 (JP) .............................. JP2017-203747

(51) Int. Cl.
*G06Q 50/30* (2012.01)
*G07C 9/00* (2020.01)
(Continued)

(52) U.S. Cl.
CPC ............. *G06Q 50/30* (2013.01); *B60N 3/104* (2013.01); *B60Q 9/00* (2013.01); *G06Q 10/0832* (2013.01);
(Continued)

(58) Field of Classification Search
CPC ..... G06Q 50/30; G06Q 10/0832; H04W 4/44; H04W 4/029; H04W 4/35; H04W 4/80;
(Continued)

(56) References Cited

U.S. PATENT DOCUMENTS

2002/0067261 A1* 6/2002 Kucharczyk ............. G07C 9/21
340/568.1
2005/0083176 A1* 4/2005 Yamada ................. G06Q 10/08
340/5.73
(Continued)

FOREIGN PATENT DOCUMENTS

JP 2002-304449 A 10/2002
WO WO 2015/149910 A1 * 10/2015 ............... G07C 9/00
(Continued)

OTHER PUBLICATIONS

Dairy Field, "The big chill: the latest innovations in truck, trailer and reefer technologies improve dairy delivery efficiencies. (Distribution Report).", 186.4: 48, Stagnito Publishing Company, Apr. 2003.*

*Primary Examiner* — Nathan Erb
(74) *Attorney, Agent, or Firm* — Hunton Andrews Kurth LLP

(57) ABSTRACT

A delivery system includes: a first vehicle including a first delivery box; a second vehicle including a second delivery box; a user terminal configured to be operated by a user; a deliverer terminal used by a deliverer during delivery; and a server configured to communicate with the first vehicle, the second vehicle, the user terminal, and the deliverer terminal. When the server receives a change signal from the user terminal to change a delivery destination for a delivery item from the first vehicle to the second vehicle, the server is configured to transmit required information to the deliverer terminal, the required information being required for the deliverer to deliver the delivery item to the second vehicle.

8 Claims, 13 Drawing Sheets

(51) Int. Cl.
*B60Q 9/00* (2006.01)
*B60N 3/10* (2006.01)
*H04W 4/44* (2018.01)
*H04W 4/029* (2018.01)
*H04W 4/35* (2018.01)
*H04W 4/80* (2018.01)
*G06Q 10/08* (2012.01)
*G07C 9/29* (2020.01)

(52) U.S. Cl.
CPC .......... *G07C 9/00896* (2013.01); *G07C 9/29* (2020.01); *H04W 4/029* (2018.02); *H04W 4/35* (2018.02); *H04W 4/44* (2018.02); *H04W 4/80* (2018.02); *G07C 2009/0092* (2013.01); *G07C 2009/00793* (2013.01)

(58) Field of Classification Search
CPC .............. G07C 9/29; G07C 9/00896; G07C 2009/00793; G07C 2009/0092; B60N 3/104; B60Q 9/00
See application file for complete search history.

(56) References Cited

U.S. PATENT DOCUMENTS

| | | | |
|---|---|---|---|
| 2013/0245986 A1* | 9/2013 | Grokop | H04M 1/72454 |
| | | | 702/141 |
| 2015/0242811 A1* | 8/2015 | Gillen | G06Q 50/01 |
| | | | 705/338 |
| 2016/0210590 A1* | 7/2016 | Sugioka | G01C 21/3415 |
| 2017/0017920 A1* | 1/2017 | Stark | B60R 25/24 |
| 2017/0234557 A1* | 8/2017 | Notaro | F24F 11/62 |
| | | | 700/278 |
| 2017/0323258 A1* | 11/2017 | Semsey | H04W 12/06 |
| 2018/0259239 A1* | 9/2018 | Kim | F25D 23/069 |
| 2018/0363964 A1* | 12/2018 | Chung | F25B 49/02 |
| 2020/0074396 A1* | 3/2020 | Boccuccia | G06K 7/1426 |
| 2020/0090117 A1* | 3/2020 | Luo | G06Q 10/083 |

FOREIGN PATENT DOCUMENTS

| | | | | |
|---|---|---|---|---|
| WO | WO-2016/079236 A1 * | 5/2016 | | G06Q 10/08 |
| WO | WO 2017/105047 A1 * | 6/2017 | | F25D 29/00 |

\* cited by examiner

FIG.10

REQUEST INFORMATION DB

| | | |
|---|---|---|
| REQUESTER ID | ○○○ | ○○○ |
| DELIVERY ITEM ID | ○○○ | ○○○ |
| DELIVERY ITEM | ○○○ | ○○○ |
| PACKAGE RECIPIENT | ○○○ | ○○○ |
| DESTINATION | ○○○ | ○○○ |
| DELIVERY TIME | ○○○ | ○○○ |
| PACKAGE RECIPIENT CONTACT INFORMATION | ○○○ | ○○○ |

FIG.11

REGISTERED VEHICLE DB

| | | |
|---|---|---|
| REGISTERED VEHICLE ID | ○○○ | ○○○ |
| VEHICLE NUMBER | ○○○ | ○○○ |
| REQUESTER ID | ○○○ | ○○○ |
| COMMUNICATION ID | ○○○ | ○○○ |
| REGISTRANT CONTACT INFORMATION | ○○○ | ○○○ |
| VEHICLE TYPE/COLOR | ○○○ | ○○○ |
| POSITION INFORMATION | ○○○ | ○○○ |

FIG.12

DELIVERER DB

| | | |
|---|---|---|
| DELIVERER ID | ○○○ | ○○○ |
| DELIVERER MOBILE PHONE NUMBER | ○○○ | ○○○ |
| DELIVERER NAME | ○○○ | ○○○ |
| POSITION INFORMATION | ○○○ | ○○○ |
| DELIVERER TERMINAL ID | ○○○ | ○○○ |

FIG.13
AUTHENTICATION CODE DB

| REGISTERED VEHICLE ID | ○○○ | ○○○ |
|---|---|---|
| CODE INFORMATION | ○○○ | ○○○ |

FIG.14
STORAGE INFORMATION DB

| COMMODITY NAME | STORAGE TYPE | STORAGE TEMPERATURE |
|---|---|---|
| HAM | REFRIGERATION REQUIRED | 5°C |
| FROZEN FRIED RICE | FREEZING REQUIRED | −5°C |
| ICE CREAM | FREEZING REQUIRED | −7°C |

FIG.15
DELIVERY ITEM DB

| DELIVERY ITEM ID | ○○○ | ○○○ |
|---|---|---|
| DELIVERY ITEM | ○○○ | ○○○ |
| PACKAGE RECIPIENT | ○○○ | ○○○ |
| DESTINATION | ○○○ | ○○○ |
| DESTINATION CONTACT INFORMATION | ○○○ | ○○○ |
| DELIVERY DATE AND TIME | ○○○ | ○○○ |
| DELIVERER TERMINAL ID | ○○○ | ○○○ |
| AUTHENTICATION INFORMATION | ○○○ | ○○○ |
| STORAGE INFORMATION | ○○○ | ○○○ |
| PACKAGE RECIPIENT CONTACT INFORMATION | ○○○ | ○○○ |

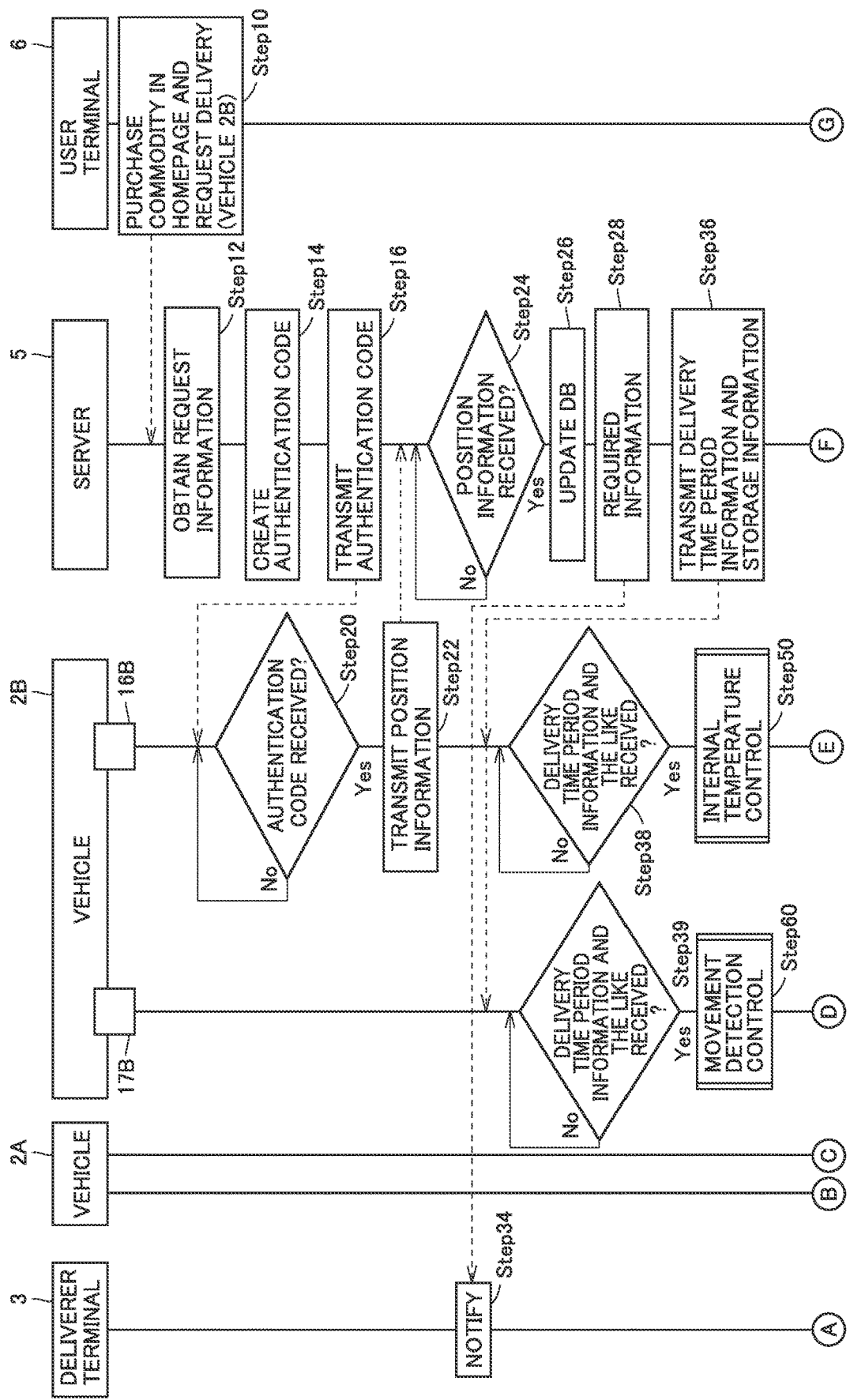

FIG.20

CHANGE SIGNAL

| REQUESTER ID | ○○○ | |
|---|---|---|
| DELIVERY ITEM ID | ○○○ | |
| DELIVERY ITEM | ○○○ | |
| PACKAGE RECIPIENT | ○○○ | ○○○ |
| DESTINATION | ○○○ | □□□ |
| DELIVERY DATE AND TIME | ○○○ | ○○○ |
| PACKAGE RECIPIENT CONTACT INFORMATION | ○○○ | ○○○ |

DELIVERY SYSTEM, SERVER, AND VEHICLE

This nonprovisional application is based on, and claims priority to, Japanese Patent Application No. 2017-203747 filed on Oct. 20, 2017, with the Japan Patent Office, the entire contents of which are hereby incorporated by reference.

BACKGROUND

Field

The present disclosure relates to a delivery system, a server, and a vehicle.

Description of the Background Art

A delivery system for delivering a delivery item to a predetermined destination has been conventionally known. For example, a delivery system described in Japanese Patent Laying-Open No. 2002-304449 includes: a user terminal provided at a designated recipient side; a deliverer terminal provided at a deliverer side; and a communication network for communicatively connecting the user terminal and the deliverer terminal to each other.

Through the deliverer terminal, the deliverer publishes information about pieces of package for redelivery in the form of a homepage on the communication network. The designated recipient accesses the homepage through the user terminal, and inputs (i) information for specifying his/her package among the pieces of package for redelivery, (ii) a designated location for receiving the package, and (iii) information including a designated time or time period for receiving the package.

Then, the package for redelivery is delivered to the designated location at the designated time, whereby the designated recipient can receive the redelivered package.

SUMMARY

The above-described delivery system is a system for delivering a delivery item to home or shop; however, it has not been considered at all to utilize a vehicle as the delivery destination for the delivery item.

On the other hand, the inventors of the present application have been considering a system for delivering a delivery item to a delivery box provided in a vehicle. In this delivery system, for example, if a user goes out using the vehicle that has been designated as a delivery destination, a deliverer cannot deliver the delivery item at a delivery time to the vehicle designated as the delivery destination, with the result that the delivery item needs to be redelivered.

The present disclosure has been made in view of the above problem, and has an object to provide a delivery system, a server, and a vehicle, by each of which occurrence of redelivery can be suppressed even when a vehicle designated as a destination is used.

A delivery system according to the present disclosure includes: a first vehicle including a first delivery box; a second vehicle including a second delivery box; a user terminal configured to be operated by a user; a deliverer terminal used by a deliverer during delivery; and a server configured to communicate with the first vehicle, the second vehicle, the user terminal, and the deliverer terminal. When the server receives a change signal from the user terminal to change a delivery destination for a delivery item from the first vehicle to the second vehicle, the server is configured to transmit required information to the deliverer terminal, the required information being required for the deliverer to deliver the delivery item to the second vehicle.

According to the above-described delivery system, the user can change the delivery destination from one vehicle to another vehicle, thereby reducing a possibility of redelivery. Further, since the required information for delivering to the vehicle designated as the changed delivery destination is transmitted to the deliverer terminal, the deliverer can deliver the delivery item to the vehicle designated as the changed delivery destination.

The required information includes position information of the second vehicle. According to this delivery system, the deliverer can go to the second vehicle.

The second vehicle includes a locking device configured to switch between (i) a state in which the delivery item is able to be accommodated in the second delivery box and (ii) a state in which the delivery item is not able to be accommodated in the second delivery box. When a predetermined authentication code is provided from the deliverer terminal, the locking device is brought into the state in which the delivery item is able to be accommodated in the second delivery box. The required information includes the predetermined authentication code.

According to the above-described delivery system, the deliverer can put the delivery item in the second delivery box of the second vehicle.

The second delivery box is a cooling box. The second vehicle further includes a controller configured to control the cooling box. When the controller obtains storage information indicating a storage environment of the delivery item, the controller is configured to operate the cooling box to bring an internal environment of the cooling box into the storage environment. When the server receives the change signal, the server is configured to transmit the storage information to the second vehicle.

According to the above-described delivery system, the second vehicle can preserve the delivery item suitably by operating the cooling box based on the storage information.

A server according to the present disclosure includes: a communication device configured to communicate with a first vehicle including a first delivery box, a second vehicle including a second delivery box, a user terminal configured to be operated by a user, and a deliverer terminal used by a deliverer during delivery; and a processor configured to transmit, when the server receives a change signal from the user terminal to change a delivery destination for a delivery item from the first vehicle to the second vehicle, required information to the deliverer terminal, the required information being required for the deliverer to deliver the delivery item to the second vehicle.

A vehicle according to the present disclosure includes: a delivery box; a notifying device configured to notify information to surroundings; and an obtaining device configured to obtain information from outside, the obtaining device being configured to obtain a delivery time period in which a delivery item is to be delivered to the delivery box, the notifying device being configured to notify a warning to the surroundings when the vehicle moves in the delivery time period.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a schematic view schematically showing a request information database 48.

FIG. 11 schematically shows a registered vehicle database 44.

FIG. 12 schematically shows a deliverer database 45.

FIG. 13 schematically shows an authentication code database 46.

FIG. 14 schematically shows a storage information database 49.

FIG. 15 schematically shows a delivery item database 43.

FIG. 16 shows a state transition diagram of delivery system 1.

FIG. 20 schematically shows a change signal.

DESCRIPTION OF THE PREFERRED EMBODIMENTS

Figure 1:
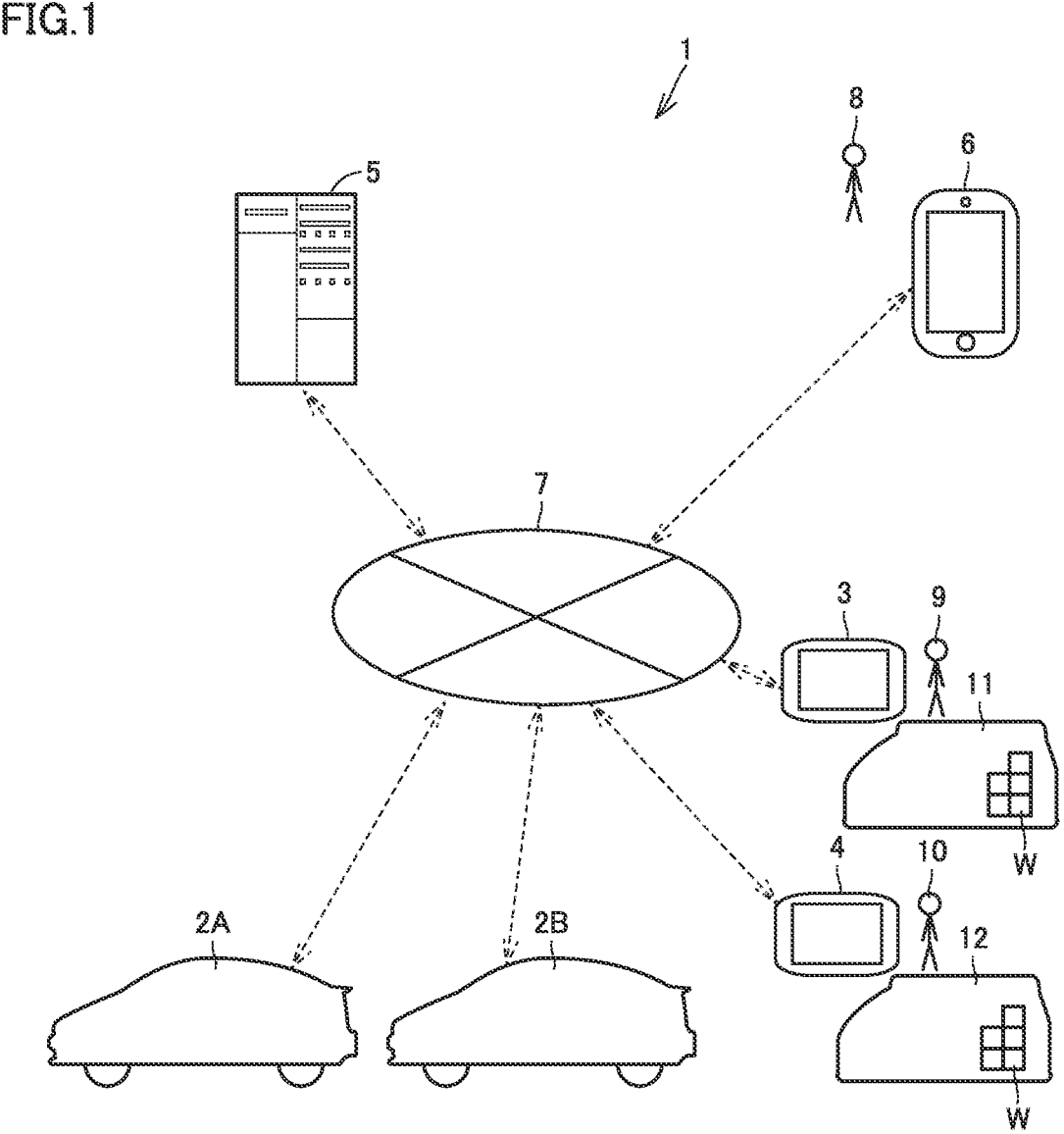
FIG. 1 is a block diagram schematically showing a delivery system 1.

With reference to FIG. 1 to FIG. 20, the following describes a delivery system 1 according to the present embodiment. The same or substantially same configurations of the configurations shown in FIG. 1 to FIG. 20 are given the same reference characters and will not be described repeatedly.

FIG. 1 is a block diagram schematically showing a delivery system 1. Delivery system 1 includes vehicles 2A, 2B, deliverer terminals 3, 4, a server 5, a user terminal 6, and Internet 7.

Vehicles 2A, 2B, deliverer terminals 3, 4, server 5, and user terminal 6 are configured to communicate with one another via Internet 7.

Deliverer terminal 3 is used by a deliverer 9 when delivering a delivery item W, and deliverer terminal 4 is used by a deliverer 10 when delivering a delivery item W.

Based on information presented on deliverer terminals 3, 4, deliverers 9, 10 deliver delivery items W to designated destinations.

User terminal 6 is used by a user 8 who utilizes delivery system 1. Examples of user terminal 6 include a personal computer, a smartphone, a mobile phone, and the like.

User 8 can input various types of information using user terminal 6. For example, user 8 can access an e-commerce homepage to purchase a commodity, and can designate a cooling box (delivery box) provided in vehicle 2A or 2B as a delivery destination for the commodity.

Server 5 is configured to communicate with vehicles 2A, 2B, deliverer terminals 3, 4, and user terminal 6 via Internet 7. Server 5 transmits various types of information to vehicles 2A, 2B, deliverer terminals 3, 4, and user terminal 6 using (i) information transmitted from vehicles 2A, 2B, deliverer terminals 3, 4, and user terminal 6, (ii) information stored in server 5, and the like.

Based on the information obtained from server 5 or the like, deliverers 9, 10 deliver to vehicles 2A, 2B or the like, for example.

Figure 2:
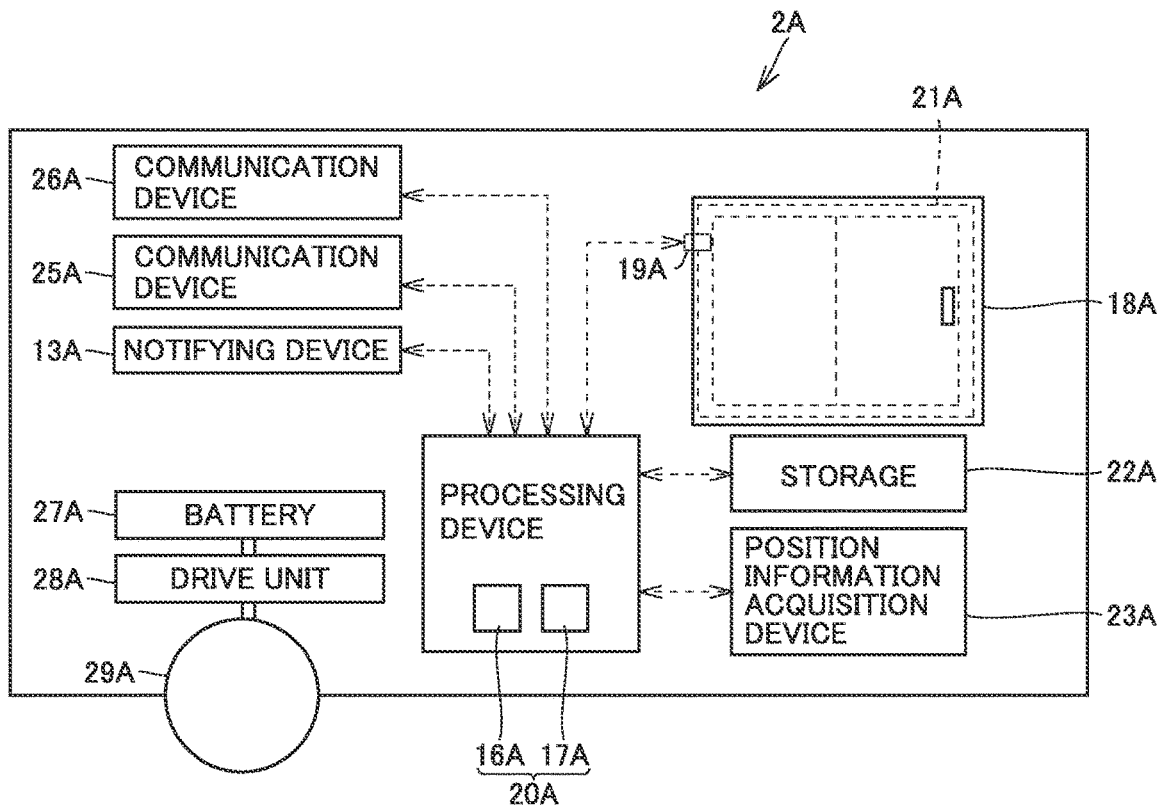
FIG. 2 is a block diagram showing a configuration of a vehicle 2A.

FIG. 2 is a block diagram showing a configuration of vehicle 2A. Vehicle 2A includes a notifying device 13A, an outer door 18A, a locking device 19A, a processing device 20A, a cooling box 21A, a storage 22A, a position information acquisition device 23A, a communication device 25A, a communication device 26A, a battery 27A, a drive unit 28A, and driving wheels 29A.

Notifying device 13A includes a display, a speaker, and the like, and the display is a navigation screen, for example.

Processing device 20A includes a processor 16A and a processor 17A. Processors 16A, 17A are configured to perform arithmetic processes using information stored in storage 22A, information obtained via communication devices 25A, 26A, and the like. The arithmetic processes of processors 16A, 17A may be performed by software or hardware such as an electric circuit.

Storage 22A is a nonvolatile memory in which various types of information are stored. It should be noted that storage 22A stores a database for controlling an internal temperature of cooling box 21A.

Position information acquisition device 23A is configured to obtaining position information of vehicle 2A. As a method for obtaining the position information of vehicle 2A, there can be employed: a method for obtaining the position information from WiFi; a method for obtaining the position information using GPS (Global Positioning System); or the like. The position information obtained by position information acquisition device 23A is transmitted to processing device 20A.

Communication device 25A is configured to communicate with server 5 or user terminal 6 through Internet 7.

Communication device 26A is configured to communicate with deliverer terminals 3, 4, and to obtain an authentication code and storage information of delivery item W and transmit cooling-box internal information, for example. Communication device 26A is configured to transmit and receive a signal through Bluetooth Low Energy (BLE) communication, for example. It should be noted that communication device 25A may be configured to include the function of communication device 26A, or communication device 26A may be configured to include the function of communication device 25A. That is, communication devices 25A, 26A are configured to communicate with server 5 and at least one of deliverer terminals 3, 4.

Battery 27A is a secondary battery capable of charging and discharging electric power. For example, a lithium ion secondary battery or the like can be employed.

Drive unit 28A includes a DC-DC converter, an inverter, and a motor. The DC-DC converter boosts DC power supplied from battery 27A, and supplies it to the inverter. The inverter converts the DC power supplied from the DC-DC converter into AC power, and supplies it to the motor. The motor is driven by the AC power supplied from the inverter, whereby driving wheels 29A are driven.

Outer door 18A is provided at the outer peripheral surface of vehicle 2A. Cooling box 21A can be accessed by opening outer door 18A. For example, when deliverer 9 puts delivery item W in cooling box 21A, deliverer 9 can open outer door 18A and then can put delivery item W in cooling box 21A.

Locking device 19A is configured to maintain outer door 18A at the close state, and is configured to switch, based on a signal from processor 16A, between a state in which outer door 18A can be opened and closed and a state in which outer door 18A is maintained at the close state.

Figure 3:
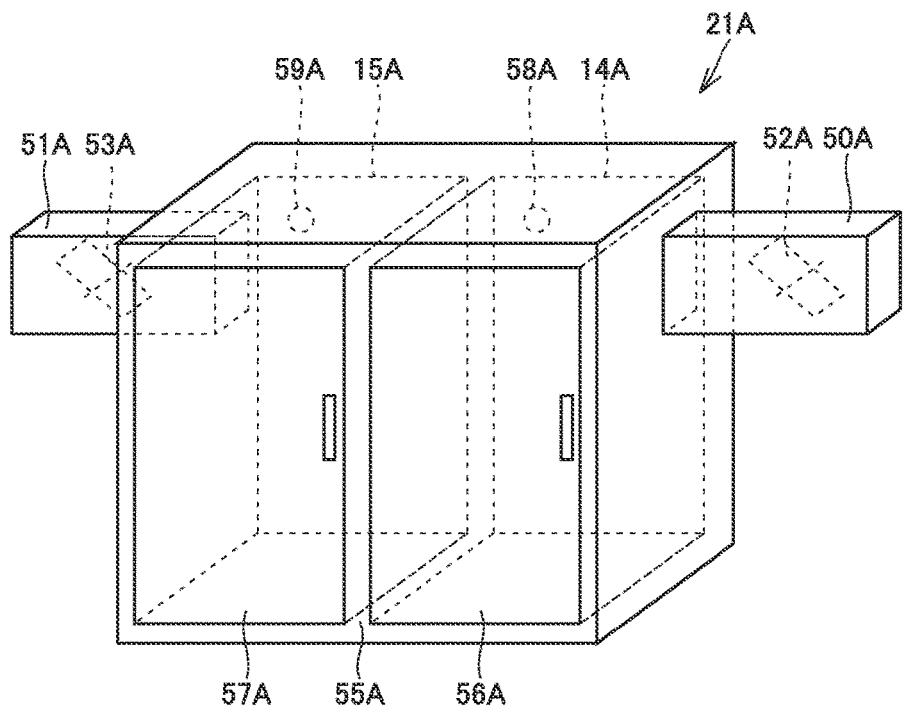
FIG. 3 is a perspective view schematically showing a cooling box 21A.

FIG. 3 is a perspective view schematically showing cooling box 21A. Cooling box 21A includes a main body 55A, doors 56A, 57A, and temperature sensors 58A, 59A. In cooling box 21A, a refrigerator compartment 14A and a freezer compartment 15A are formed.

Door 56A is configured to open and close refrigerator compartment 14A, and door 57A is configured to open and close freezer compartment 15A.

Temperature sensor 58A is provided in refrigerator compartment 14A to measure a temperature in refrigerator compartment 14A. Temperature sensor 59A is provided in freezer compartment 15A to measure a temperature in freezer compartment 15A.

It should be noted that cooling box 21A includes a cooling circuit, cooling pipes 50A, 51A, and dampers 52A, 53A. The cooling circuit includes a condenser, an expansion valve, an evaporator, and a compressor.

Cooling pipe 50A is used for supplying refrigerator compartment 14A with air cooled by the evaporator. Cooling pipe 51A is used for supplying freezer compartment 15A with air cooled by the evaporator.

Damper 52A is rotatably disposed at cooling pipe 50A, and can adjust a flow rate of the cooled air entering refrigerator compartment 14A by adjusting an rotation angle of damper 52A.

Damper 53A is rotatably disposed at cooling pipe 51A, and can adjust a flow rate of the cooled air entering freezer compartment 15A by adjusting an rotation angle of damper 53A. It should be noted that the rotation angles of dampers 52A, 53A are controlled by processor 16A.

Processor 16A adjusts an opening degree of each damper to adjust an amount of cooled air supplied to refrigerator compartment 14A and freezer compartment 15A, thereby adjusting the internal temperature of refrigerator compartment 14A and the internal temperature of freezer compartment 15A.

Each of temperature sensors 58A, 59A transmits detected temperature information to processor 16A. Processor 16A adjusts the opening degree of damper 52A based on the detected temperature of temperature sensor 58A and a target value of the internal temperature of refrigerator compartment 14A. Similarly, processor 16A adjusts the opening degree of damper 53A based on the detected temperature of temperature sensor 59A and a target value of the internal temperature of freezer compartment 15A.

It should be noted that storage 22A stores data for calculating the opening degree of each of dampers 52A, 53A from a difference between the internal temperature and the target value of the internal temperature.

Figure 4:
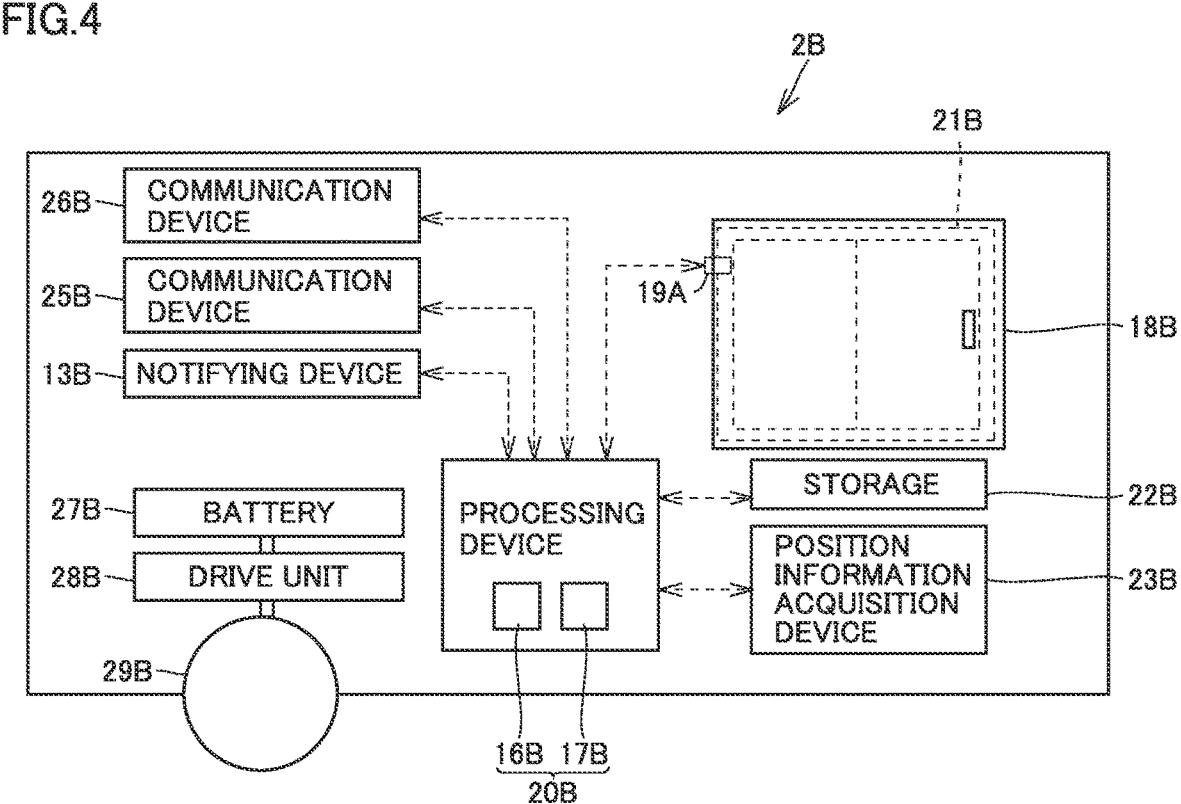
FIG. 4 is a block diagram schematically showing a configuration of a vehicle 2B.

FIG. 4 is a block diagram schematically showing a configuration of vehicle 2B. It should be noted that vehicle 2B is configured to be the same as vehicle 2A. Therefore, the same configurations as those of vehicle 2A among the configurations of vehicle 2B are given the same reference characters as the reference characters in vehicle 2A.

Figure 5:
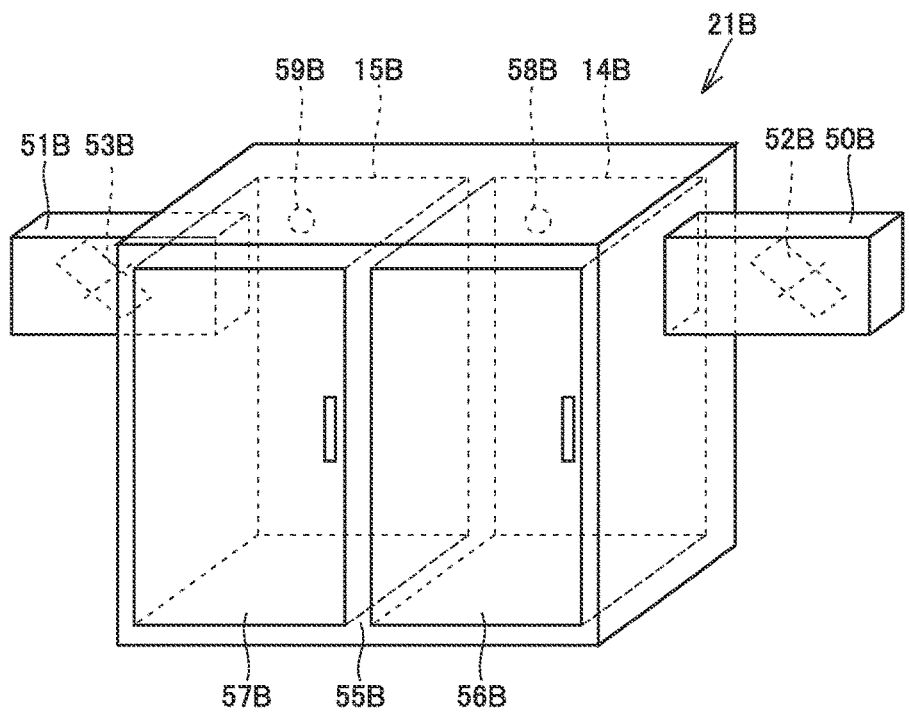
FIG. 5 is a perspective view schematically showing a cooling box 21B provided in vehicle 2B.

FIG. 5 is a perspective view schematically showing cooling box 21B provided in vehicle 2B. Cooling box 21B is configured to be the same as cooling box 21A. The same configurations as those of cooling box 21A among the configurations of cooling box 21B are given the same reference characters as the reference characters in cooling box 21A.

Figure 6:
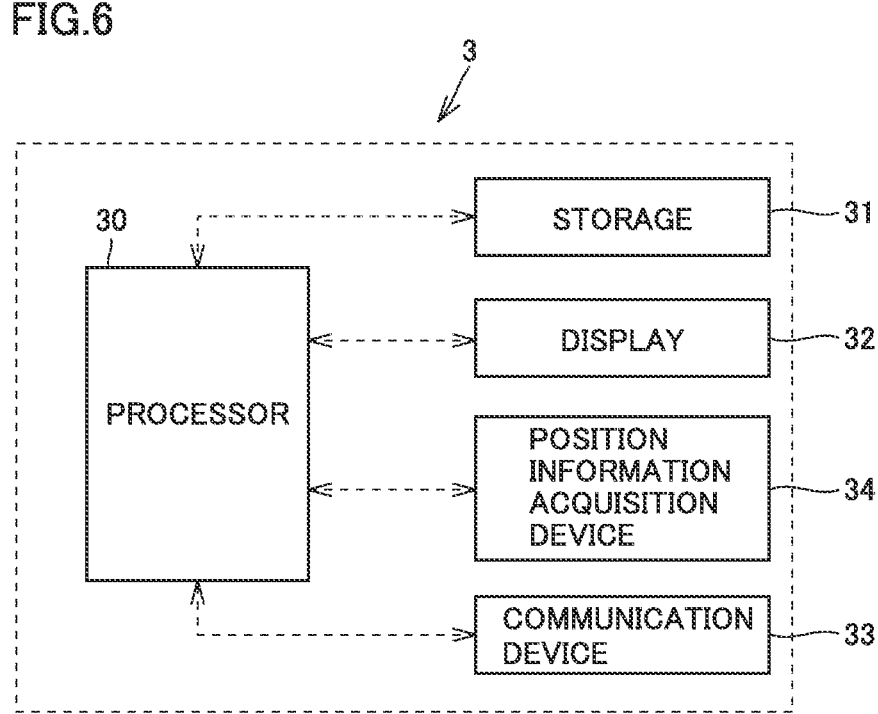
FIG. 6 is a block diagram showing a configuration of a deliverer terminal 3.

FIG. 6 is a block diagram showing a configuration of deliverer terminal 3. It should be noted that since the configurations of deliverer terminal 3 and deliverer terminal 4 are substantially the same, deliverer terminal 3 will be described. Deliverer terminal 3 includes a processor 30, a storage 31, a display 32, a communication device 33, and a position information acquisition device 34.

Processor 30 is perfirns various types of arithmetic processes based on information obtained through communication device 33, information stored in storage 31, and the like. The arithmetic processes by processor 30 may be performed by software or may be performed by hardware such as an electric circuit.

Storage 31 is a nonvolatile memory. Storage 31 stores various types of information. Display 32 is a screen for notifying various types of information to deliverer 9, such as a touch panel type liquid crystal display. Deliverer 9 can perform various types of operations using display 32. Thus, display 32 also functions as an input device onto which deliverer 9 performs various types of operations. Communication device 33 communicates with server 5 or the like via Internet 7. Position information acquisition device 34 is configured to obtain the position information of deliverer terminal 3.

Position information acquisition device 34 transmits the obtained position information to processor 30, and processor 30 transmits the position information to server 5 moment by moment via communication device 33.

Figure 7:
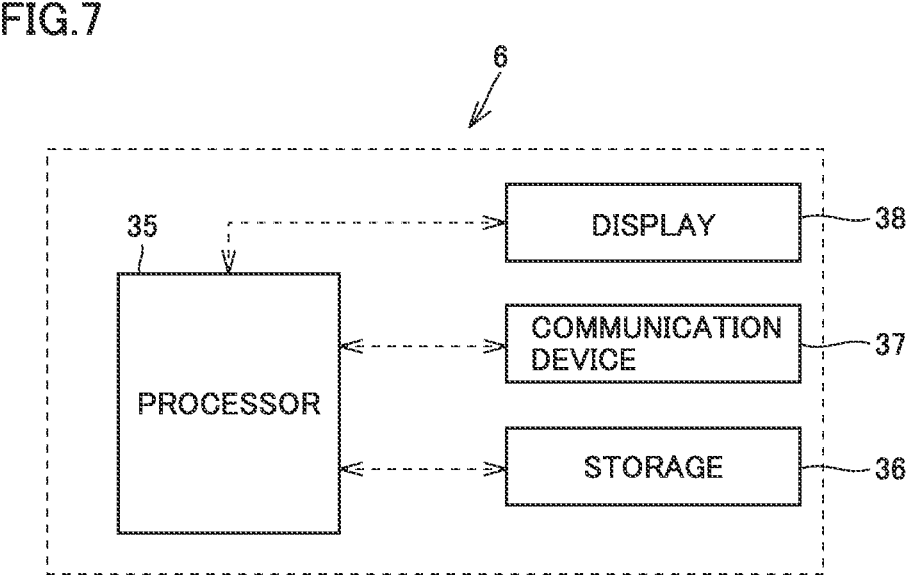
FIG. 7 is a block diagram schematically showing a configuration of a user terminal 6 used by a user 8.

FIG. 7 is a block diagram schematically showing the configuration of user terminal 6 used by user 8. User terminal 6 includes a processor 35, a storage 36, a communication device 37, and a display 38.

Storage 36 is a nonvolatile memory, and stores various types of information. Communication device 37 communicates with server 5 or the like via Internet 7.

Display 38 notifies various types of information to user 8. Display 38 is a touch panel type display, such as a liquid crystal display or an organic EL display. Hence, user 8 can input various types of information using display 38, and display 38 also functions as an input device.

Processor 35 performs an arithmetic process using the information obtained through communication device 37, the information input via display 38, the information stored in storage 36, and the like. The arithmetic process of processor 35 is performed by software or hardware such as an electric circuit.

It should be noted that when user 8 purchases a commodity by way of e-commerce, user 8 accesses a homepage of the e-commerce company in a server thereof.

Figure 8:
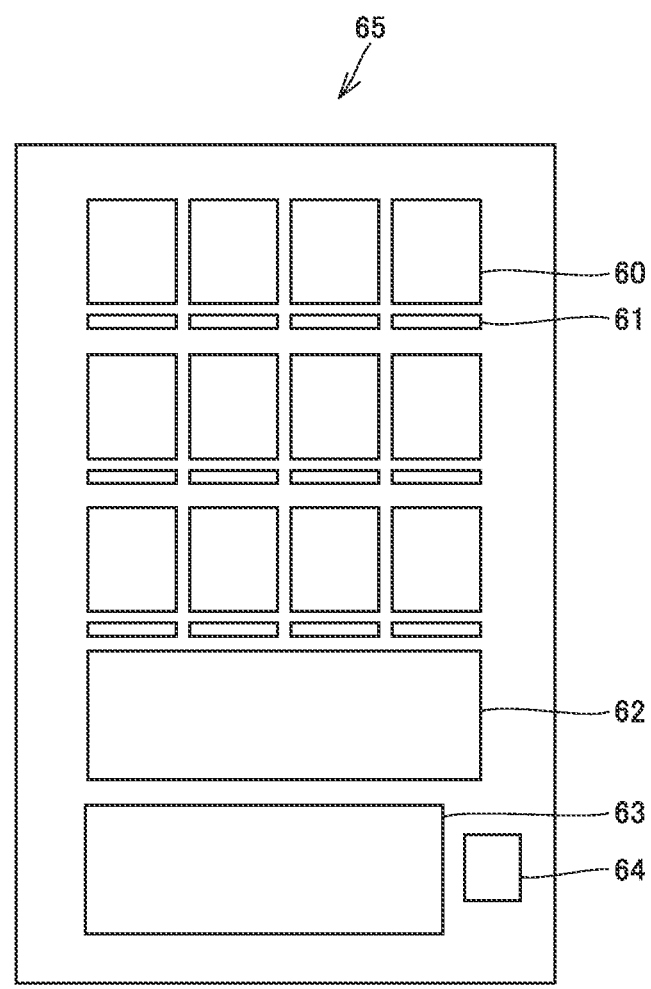
FIG. 8 schematically shows an image presented on a display 38 when accessing a homepage of an e-commerce company.

FIG. 8 schematically shows an image presented on display 38 when the homepage of the e-commerce company is accessed.

Image 65 includes: a plurality of commodity images 60; a purchase button 61 provided for each commodity image 60; a purchase list 62; a delivery form 63; and a determination button 64. Each commodity image 60 includes a commodity image and an explanation of the commodity.

Purchase button 61 is provided for each commodity image 60. Purchase button 61 is selected when user 8 purchases a commodity indicated in a corresponding commodity image 60. In purchase list 62, a list of commodities to be purchased are described.

Delivery form 63 is a form for inputting: a delivery destination for a commodity to be purchased; desired delivery date and time; a package recipient; and package recipient contact information.

Determination button 64 is selected by user 8 after finishing the determination of the commodity to be purchased, the input of the delivery destination, and the input of the desired delivery time. When determination button 64 is selected, the purchased commodity, the delivery destination, and the desired delivery date and time are determined.

User 8 can select vehicles 2A, 2B as delivery destinations. In order to designate vehicles 2A, 2B as the delivery destinations, it is necessary to register vehicles 2A, 2B in advance as delivery destinations in the homepage of the e-commerce company.

Figure 9:
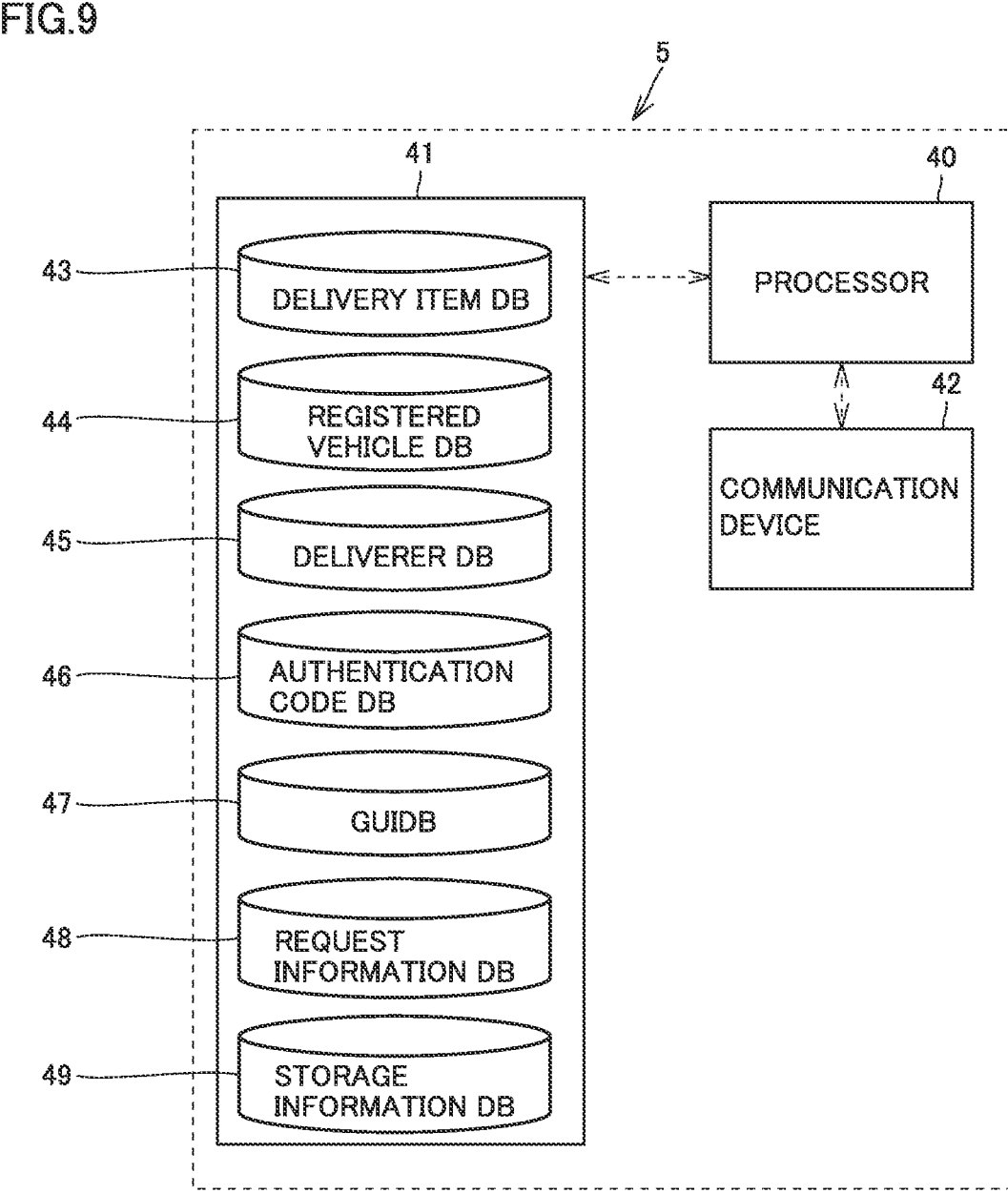
FIG. 9 is a block diagram schematically showing a configuration of a server 5.

FIG. 9 is a block diagram schematically showing a configuration of server 5. Server 5 includes a processor 40, a storage 41, and a communication device 42.

Communication device 42 is configured to communicate with user terminal 6, deliverer terminals 3, 4, and vehicles 2A, 2B.

Processor 40 performs an arithmetic process using various types of information stored in storage 41, information obtained through communication device 42, and the like. The arithmetic process of processor 40 is performed by software or hardware such as an electric circuit.

Storage 41 stores a delivery item database 43, a registered vehicle database 44, a deliverer database 45, an authentication code database 46, a GUI (Graphical User Interface) database 47, a request information database 48, and a storage information database 49.

GUI database 47 stores information about the homepage shown in FIG. 8. For example, processor 40 obtains request information based on GUI database 47 and an operation of user 8 in the homepage. This request information includes: information of a commodity purchased by user 8; delivery destination and desired delivery time; information for specifying user 8; and package recipient contact information. Then, processor 40 updates request information database 48 based on the obtained request information.

Request information database 48 is a database in which such request information from each user is stored. FIG. 10 is a schematic view schematically showing request information database 48. Request information database 48 stores a requester ID, a delivery item ID, a delivery item, a package recipient, a destination, a delivery time, and package recipient contact information. The "requester ID" represents an ID set for each user. The "delivery item" represents a commodity which user 8 has determined to purchase in the homepage. The "delivery date and time" is desired delivery date and time input by user 8 in the homepage. When user 8 designates vehicle 2A or 2B as the destination, the registered vehicle ID of vehicle 2A or 2B is input in the "destination". The "package recipient contact information" represents an e-mail address, telephone number, or the like of the package recipient, for example.

Registered vehicle database 44 is a database in which vehicle information registered by each user in advance as a delivery destination is stored.

FIG. 11 schematically shows registered vehicle database 44. Registered vehicle database 44 stores: a registered vehicle ID; a vehicle number described in a license plate; a requester ID; a communication ID of the vehicle; a registrant contact information; vehicle type and color; and position information.

The "registered vehicle ID" is an ID registered for each registered vehicle. The "requester ID" stores the ID of the user who has registered the vehicle. The "communication ID" is an ID for communicating with communication device 25A of the registered vehicle.

The "vehicle color/type" stores information about the color of the registered vehicle and the type of the vehicle. The "position information" stores the position information of the vehicle. It should be noted that the position information is appropriately updated in accordance with the position information obtained from the vehicle.

Deliverer database 45 stores information about deliverers 9, 10 and deliverer terminals 3, 4 carried by deliverers 9, 10.

FIG. 12 schematically shows deliverer database 45. Deliverer database 45 stores a deliverer ID, a deliverer mobile phone number, a deliverer name, position information, and a deliverer terminal ID. The "deliverer ID" represents an ID set for each of deliverers 9, 10. The "deliverer mobile phone number" represents the number of the mobile phone provided to each of deliverers 9, 10. In the "position information", the position information transmitted from each of deliverer terminals 3, 4 is stored. The "deliverer terminal ID" represents an ID set for each of deliverer terminals 3, 4.

From request information database 48, deliverer database 45, and registered vehicle database 44, processor 40 determines the delivery time for each delivery item W and determines deliverer 9 or 10 to deliver delivery item W.

Then, regarding each of delivery items for which vehicles are designated as delivery destinations of the delivery items, an authentication code is created for the delivery item ID of each delivery item.

FIG. 13 schematically shows authentication code database 46. Authentication code database 46 stores a registered vehicle ID and code information.

FIG. 14 schematically shows storage information database 49. Storage information database 49 includes a commodity name, a storage type, and a storage temperature. The "commodity name" stores the commodity name of each commodity. In the "storage type", one of necessity of refrigeration, necessity of freezing, and a normal temperature is stored. For example, the necessity of refrigeration indicates that the commodity needs to be kept refrigerated, and therefore the commodity will be accommodated and preserved in the refrigerator compartment. The "storage temperature" stores the storage temperature of the commodity. It should be noted that as the storage information, information such as a $CO_2$ concentration or humidity may be included in addition to the storage temperature.

Then, processor 40 assigns the deliverer, the delivery date and time, and the like for each delivery item W from storage information database 49, request information database 48, deliverer database 45, registered vehicle database 44, and authentication code database 46, thereby constructing delivery item database 43.

FIG. 15 schematically shows delivery item database 43. Delivery item database 43 includes a delivery item ID, a delivery item, a package recipient, a destination, destination contact information, delivery date and time, a deliverer terminal ID, authentication information, storage information, and package recipient contact information.

Processor 40 transmits the delivery information to each of deliverer terminals 3, 4 based on delivery item database 43. It should be noted that when there are a plurality of delivery items W, the storage temperature and storage type of each delivery item W are stored in the "storage information".

Then, processor 40 transmits the delivery information to each of deliverer terminals 3, 4 based on delivery item database 43.

The following describes a function of delivery system 1 configured as described above.

FIG. 16 shows a state transition diagram of delivery system 1. It should be noted that in the example shown in FIG. 16, the following describes a case where user 8 first transmits request information for designating vehicle 2B as a destination for a delivery item W and thereafter changes the destination from vehicle 2B to vehicle 2A.

User 8 uses user terminal 6 to purchase a commodity from the homepage and to request delivery thereof (Step 10). On this occasion, user 8 selects vehicle 2B as a destination in delivery form 63 of the homepage shown in FIG. 8.

When user 8 selects determination button 64, server 5 obtains the request information (Step 12). In the destination of this request information, the registered vehicle ID of vehicle 2B is stored. In the delivery item of the request information, the commodity name selected by user 8 is stored.

Next, processor 40 creates an authentication code for vehicle 2B (Step 14). The newly created authentication code is stored in authentication code database 46. This authentication code is used to unlock locking device 19B of vehicle 2B.

Processor 40 transmits the authentication code to vehicle 2B specified by the request information (Step 16). It should be noted that processor 40 can transmit the authentication information to vehicle 2B by obtaining the communication ID of vehicle 2B from registered vehicle database 44.

Vehicle 2B determines whether or not the authentication code is obtained even while vehicle 2B is being parked or and is traveling (Step 20).

When processor 16B of vehicle 2B determines that the authentication code is obtained (Yes in Step 20), processor 16B transmits the position information to server 5 (Step 22). The position information of vehicle 2B can be obtained by position information acquisition device 23B. It should be noted that the position information is transmitted together with the registered vehicle ID, for example.

When server 5 transmits the authentication code (Step 16), server 5 stands by until the position information is obtained from vehicle 2B (Step 24).

When processor 40 of server 5 obtains the position information from vehicle 2B, processor 40 updates the various types of databases (Step 26). Specifically, the position information in registered vehicle database 44, delivery item database 43, and the like are updated. Based on this updated delivery item database 43, the various types of information are transmitted to vehicle 2B and deliverer terminals 3, 4.

Then, processor 40 of server 5 transmits required information to deliverer terminal 3 (Step 28). The required information is information required for deliverer 9 to deliver delivery item W to vehicle 2B.

It should be noted that in the embodiment, the required information includes: the position information of vehicle 2B; and the authentication code for unlocking locking device 19B.

Specifically, processor 40 of server 5 transmits, to deliverer terminal 3, the registered vehicle information of vehicle 2B, the delivery information of delivery item W, and the authentication code. Processor 40 obtains the registered vehicle information of vehicle 2B from registered vehicle database 44, and the registered vehicle information of vehicle 2B includes the position information of vehicle 2B.

Processor 40 can obtain the registered vehicle information of vehicle 2B from registered vehicle database 44 based on the registered vehicle ID of vehicle 2B. The delivery information can be obtained from updated delivery item database 43. The authentication code is an authentication code created in Step 14, and is stored in authentication code database 46.

When deliverer terminal 3 receives the required information, deliverer terminal 3 notifies, by way of display 32, deliverer 9 that each of the above-described pieces of information has been received (Step 34). Specifically, display 32 presents that each of the above-described pieces of information has been received. It should be noted that deliverer 9 can check the received contents by operating display 32.

Processor 40 of server 5 transmits: a delivery time period during which delivery item W is to be delivered to vehicle 2B; and storage information of delivery item W (Step 36). Here, the delivery time period is a time period including the delivery time and predetermined times before and after the delivery time.

It should be noted that although user 8 designates the delivery time in the present embodiment, user 8 may designate a delivery time period. In this case, the delivery time period designated by user 8 is stored in server 5 and is also transmitted to vehicle 2B.

Via communication device (obtaining device) 26B, processor 16B and processor 17B of vehicle 2B obtain: the information indicating the delivery time period; and the storage information. After transmitting the position information (Step 22), processor 16B stands by until the information indicating the delivery time period and the storage information are obtained (Step 38).

Then, when processor 16B determines that the information indicating the delivery time period and the storage information have been obtained (Yes in Step 38), processor 16B performs internal temperature control (Step 50).

Figure 17:
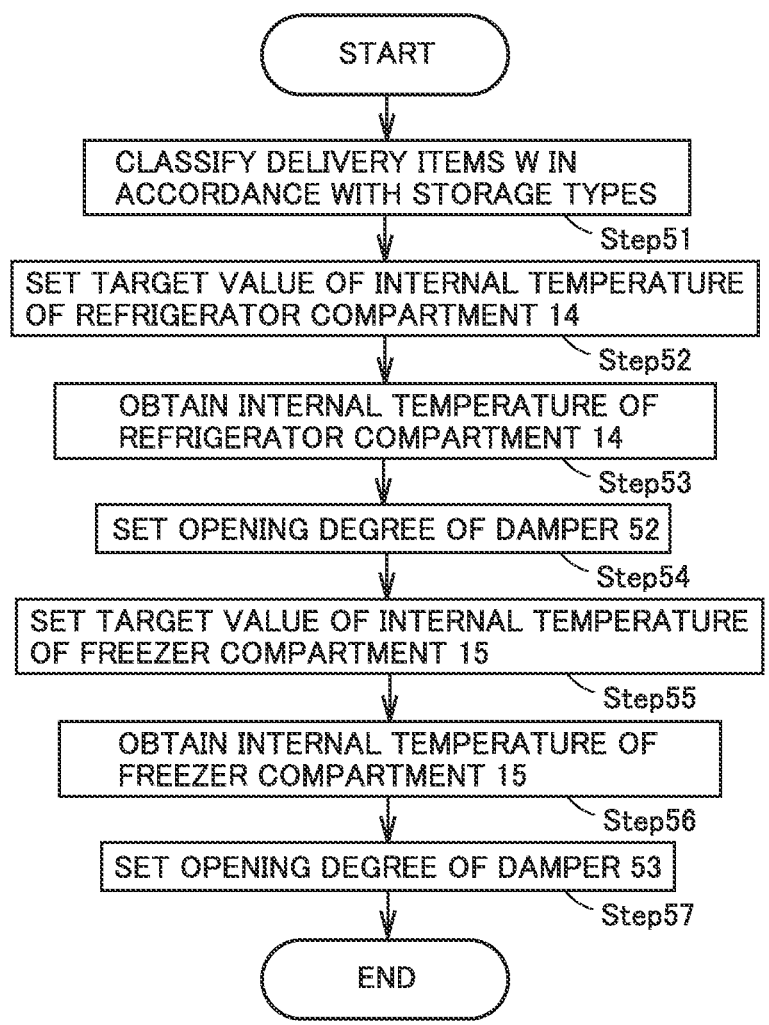
FIG. 17 is a flowchart specifically showing internal temperature control.

FIG. 17 is a flowchart specifically showing the internal temperature control. Processor 16B classifies delivery items W in accordance with storage types (Step 51).

Via communication device 25B, processor 16B obtains storage information for each delivery item W from server 5, and can classify delivery items W based on the information. Specifically, processor 16B of vehicle 2 classifies delivery items W into delivery items W whose storage type indicates the "necessity of refrigeration" and delivery items W whose storage type indicates the "necessity of freezing".

Processor 16B sets a target value of the internal temperature of refrigerator compartment 14B (Step 52). Among the storage temperatures of delivery items W whose storage types indicate the "necessity of refrigeration", the lowest storage temperature is set as the target value of the internal temperature of refrigerator compartment 14B. Thus, vehicle 2B obtains the target value of the internal temperature (internal environment) of refrigerator compartment 14B from server 5.

Processor 16B obtains the internal temperature of refrigerator compartment 14B from temperature sensor 59B (Step 53). Processor 16B sets an opening degree of damper 52B (Step 54).

Specifically, processor 16B calculates a differential temperature, which is a difference between the target value of the internal temperature of refrigerator compartment 14B and the internal temperature of refrigerator compartment 14B measured by temperature sensor 59B. Next, processor 16B calculates a differential time of the delivery time period from the current time. Then, processor 16B sets an opening degree of damper 52B to cause the differential temperature to be smaller than a predetermined value (for example, 1 degree) after the differential time. It should be noted that the opening degree of damper 52B can be calculated based on the differential temperature, the differential time, and the data stored in storage 22B.

Next, processor 16B sets the target value of the internal temperature of freezer compartment 15B (Step 55). Among the storage temperatures of delivery items W whose storage types indicate the "necessity of freezing", the lowest storage temperature is set as the target value of the internal temperature of freezer compartment 15B. Thus, vehicle 2B obtains the target value of the internal temperature (internal environment) of freezer compartment 15B from server 5.

Then, processor 16B obtains the internal temperature of freezer compartment 15B from temperature sensor 58 (Step 56). Processor 16B sets an opening degree of damper 53B (Step 57).

Specifically, the differential temperature between the internal temperature of freezer compartment 15B and the target value is calculated. Based on this differential temperature, the differential time, and the data stored in storage 22B, processor 16B sets the opening degree of damper 53B.

By setting the respective degrees of opening of dampers 53A, 53B as described above, the internal temperature of refrigerator compartment 14B and the internal temperature of freezer compartment 15B can become the respective target values or values around the respective target values in the delivery time period. Accordingly, when delivery item W is delivered in the delivery time period, delivery item W can be preserved suitably.

It should be noted that in the present embodiment, it has been illustratively described that attention is paid to the internal temperature as the internal environment of cooling box 21B; however, $CO_2$ concentration and humidity in the cooling box may be taken into consideration as the internal environment.

Turning back to FIG. 16, processor 17B stands by until the delivery time period information is obtained (Step 39).

When processor 17B obtains the delivery time period information (Yes in Step 39), processor 17B performs movement detection control (Step 60). This movement detection control is control for notifying a warning to the vehicle user when vehicle 2B moves during the delivery time period.

Figure 18:
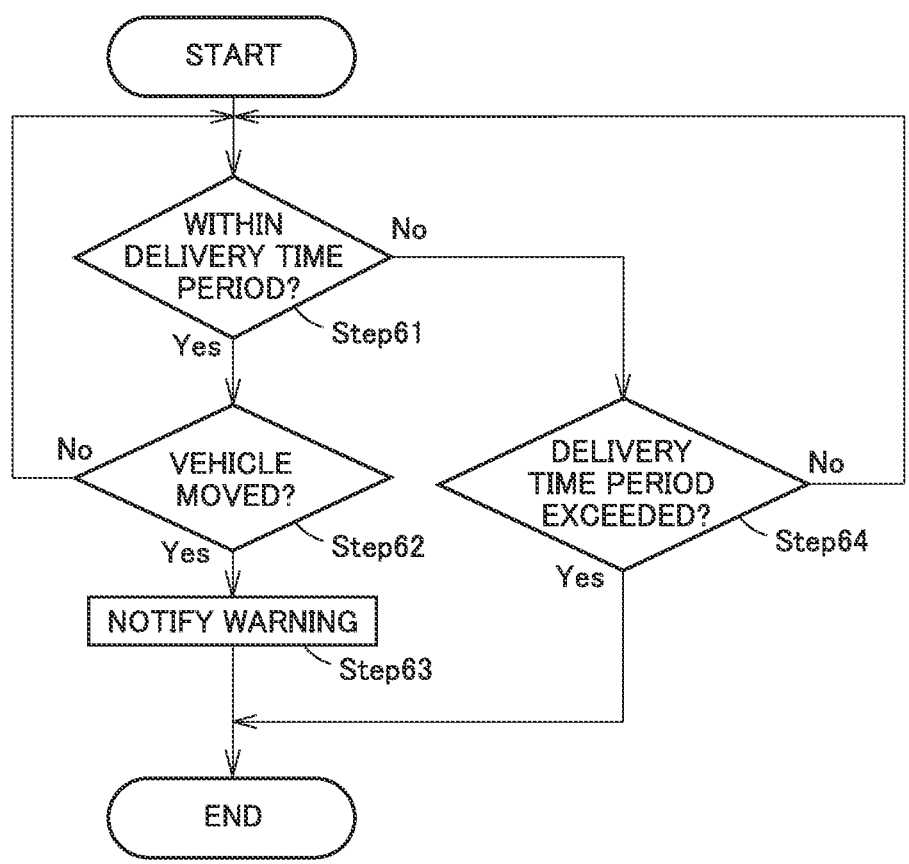
FIG. 18 is a flowchart showing a control flow of movement detection control.

FIG. 18 is a flowchart showing a control flow of the movement detection control. Processor 17B determines whether or not the current time is in the delivery time period (Step 61). When processor 17B determines that the current time is in the delivery time period (Yes in Step 61), processor 17B determines whether or not vehicle 2B is moving (Step 62). When processor 17B determines that vehicle 2B is moving (Yes in Step 62), processor 17B operates notifying device 13B to notify a warning to the vehicle user. Specifically, processor 17B presents, on the navigation screen, that the current time is in the delivery time period. It should be noted that when processor 17B determines that vehicle 2B is not moving (No in Step 62), the process is returned to Step 61 above.

When processor 17B determines in Step 61 described above that the current time is not in the delivery time period (Step 61), processor 17B determines whether or not the current time has exceeded the delivery time period (Step 63). Then, when processor 17B determines that the current time has not exceeded the delivery time period (Step 64), the process is returned to Step 61 above. This is because the current time is before the delivery time period in this case.

When processor 17B determines that the current time has exceeded the delivery time period (Yes in Step 64), processor 17B ends the movement detection control.

In this movement detection control, when vehicle 2B moves during the delivery time period, processor 17B notifies to the vehicle user that the current time is in the delivery time period. As a result, user 8 is guided to change the delivery destination for delivery item W.

In this embodiment, the following describes a case where user 8 changes the destination for delivery item W from vehicle 2B to vehicle 2A.

Figure 19:
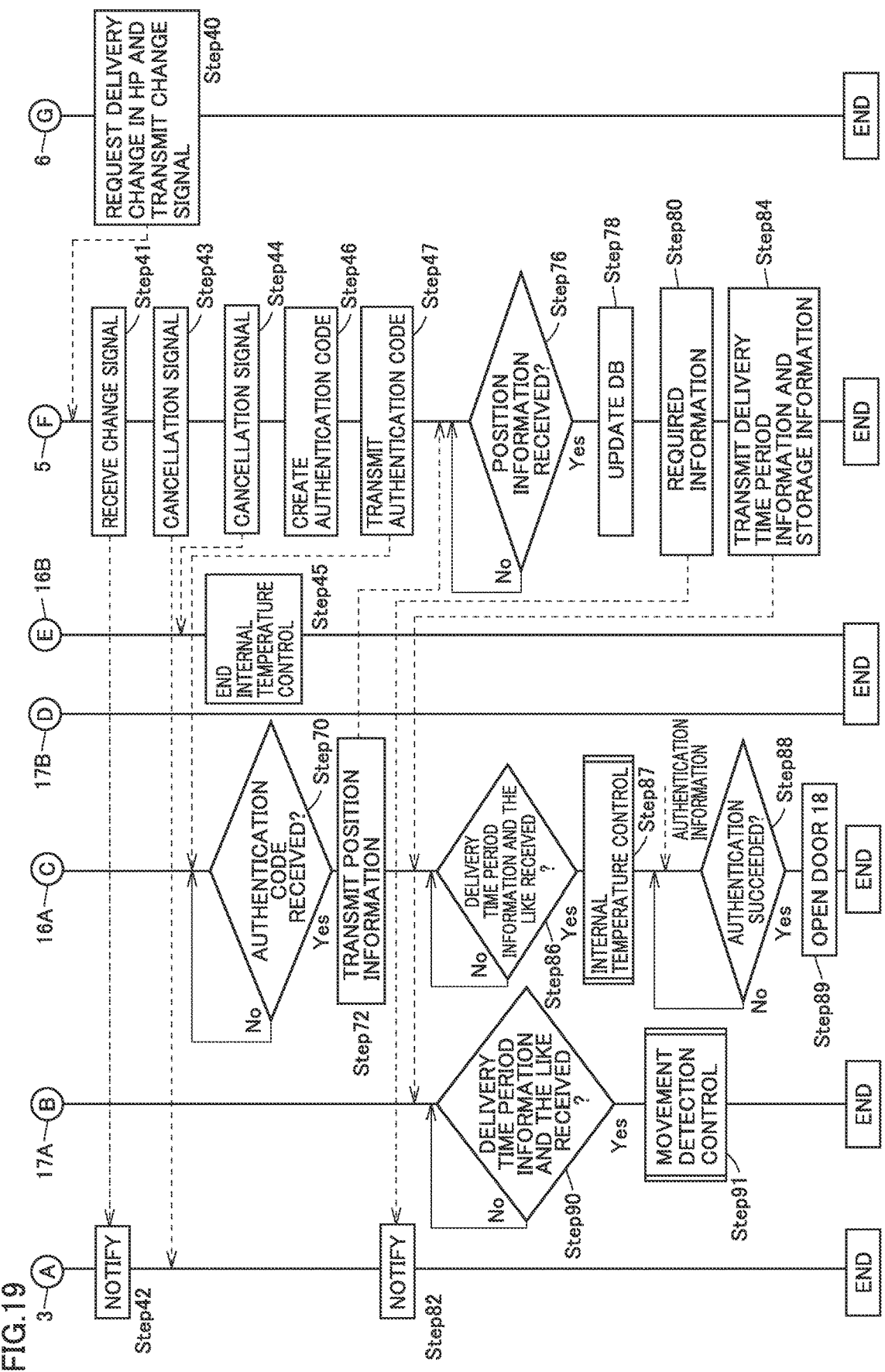
FIG. 19 is a state transition diagram subsequent to the state transition diagram shown in FIG. 17.

FIG. 19 is a state transition diagram subsequent to the state transition diagram shown in FIG. 17. User 8 can use user terminal 6 to change the destination for the purchased commodity, the delivery time, and the package recipient in delivery form 63 of the homepage. It should be noted that in the present embodiment, user 8 changes the destination from vehicle 2B to vehicle 2A.

When the above-described operation is performed in user terminal 6, a change signal is transmitted from user terminal 6 to server 5 (Step 40).

FIG. 20 schematically shows the change signal. The change signal includes information indicating the requester ID, the delivery item ID, the delivery item, the package recipient, the destination, the delivery time, and the package recipient contact information. The respective items of the destination for the purchased commodity, the delivery time, and the package recipient include the information before the change and the information after the change.

In the example shown in FIG. 20, it is shown that the destination is changed. It should be noted that in the present embodiment, the registered vehicle ID of vehicle 2B is stored in the destination before the change, whereas the registered vehicle ID of vehicle 2A is stored in the destination after the change.

Processor 40 of server 5 transmits a cancellation signal to deliverer terminal 3 based on the change of the destination from vehicle 2B to vehicle 2A (Step 43). The information shown in FIG. 20 is included in this cancellation signal.

When deliverer terminal 3 receives the cancellation signal, deliverer terminal 3 notifies to deliverer 9 that the cancellation signal has been received (Step 42). For example, deliverer terminal 3 presents on display 32 that the cancellation signal has been received. It should be noted that deliverer 9 can check the information shown in FIG. 20 by operating deliverer terminal 3. Accordingly, deliverer 9 can know that the delivery destination for delivery item W has been changed. It should be noted that at this point of time, deliverer 9 does not obtain the position information of vehicle 2B and therefore cannot deliver delivery item W to the changed destination.

Processor 40 of server 5 transmits the cancellation signal to vehicle 2B (Step 44). When vehicle 2B receives the cancellation signal from server 5, vehicle 2B ends the internal temperature control (Step 45). Accordingly, the electric power of battery 27B can be suppressed from being consumed wastefully. It should be noted that when processor 16B of vehicle 2B receives the cancellation signal, processor 16B invalidates the authentication code received from server 5 in Step 16. Accordingly, outer door 18B can be unlikely to be opened unnecessarily.

When processor 40 transmits the cancellation signal (Step 44), processor 40 newly creates an authentication code (Step 46) and transmits the authentication code and the storage information of delivery item W to vehicle 2A (Step 47). Processor 40 stores the newly created authentication code in authentication code database 46 to update authentication code database 46. Specifically, in FIG. 13, the content of the code information is updated in the registered vehicle ID of vehicle 2A.

When vehicle 2A determines that the authentication code has been received (Yes in Step 70), vehicle 2A transmits the position information thereof to server 5 (Step 72). It should be noted that the position information of vehicle 2A can be obtained from position information acquisition device 23A.

After transmitting the authentication code (Step 47), processor 40 of server 5 stands by until the position information is obtained (Step 76).

When processor 40 obtains the position information of vehicle 2A (Yes in Step 76), processor 40 updates the various types of databases (Step 78).

Specifically, the position information of vehicle 2A is updated in registered vehicle database 44, and delivery item database 43 is updated.

When the update of the various types of databases is completed, processor 40 transmits, to deliverer terminal 3, the required information required to deliver the delivery item to vehicle 2A (Step 80).

The required information includes: the position information of vehicle 2A; the authentication code for unlocking locking device 19A; and the delivery information.

Specifically, processor 40 of server 5 transmits, to deliverer terminal 3, the registered vehicle information of vehicle 2A, the delivery information of delivery item W, and the authentication code. Processor 40 obtains the registered vehicle information of vehicle 2A from registered vehicle database 44, and the registered vehicle information of vehicle 2A includes the position information of vehicle 2A. Processor 40 obtains, from registered vehicle database 44, the authentication code to be transmitted to vehicle 2A, and transmits the authentication code created in Step 56.

Processor 40 obtains, from updated delivery item database 43, the delivery information to be transmitted to deliverer terminal 3. This delivery information includes: the delivery item to be delivered to vehicle 2A by deliverer 9; the delivery date and time; the storage information of delivery item W; and the like.

When deliverer terminal 3 obtains the required information from server 5, deliverer terminal 3 notifies it to deliverer 9 (Step 82). Specifically, deliverer terminal 3 presents on display 32 of deliverer terminal 3 that the required information has been received. It should be noted that deliverer 9 can check the received required information by operating touch panel type display 32.

Processor 40 of server 5 transmits, to vehicle 2A, the delivery time information and the storage information of delivery item W (Step 84).

After transmitting the position information (Step 72), processor 16A of vehicle 2A stands by until the delivery time period information and the like is received (Step 86). When processor 16A receives the delivery time period information, processor 16A performs the internal temperature control. The internal temperature control of vehicle 2A is the same as the internal temperature control of vehicle 2B shown in FIG. 17.

Further, processor 17A of vehicle 2A stands by until the delivery time period information is obtained (Step 90), and when processor 17A receives the delivery time period information (Yes at Step 90), processor 17A performs the movement detection control (Step 91). The movement detection control of vehicle 2A is the same as the movement detection control of vehicle 2B shown in FIG. 18.

Thus, as with vehicle 2B, vehicle 2A also performs the internal temperature control and the movement detection control when the delivery time period information or the like is obtained. Accordingly, if the vehicle user uses vehicle 2A serving as the redelivery destination, a warning is notified to the vehicle user.

Deliverer 9 delivers delivery item W to vehicle 2A based on the required information obtained by deliverer terminal 3 in Step 82. In this case, the required information includes the registered vehicle information of vehicle 2A. This registered vehicle information includes the position information of vehicle 2A, and therefore deliverer 9 can deliver delivery item W to vehicle 2A.

Deliverer 9 can come close to at least a vicinity of vehicle 2A based on the obtained position information of vehicle 2. The registered vehicle information obtained by deliverer 9 includes: the vehicle number (number described in the license plate) of vehicle 2A; the vehicle type; and the vehicle color. Accordingly, deliverer 9 can visually confirm vehicle 2A readily.

Then, deliverer 9 transmits the authentication code to vehicle 2A using deliverer terminal 3. On the other hand, via communication device 25A, vehicle 2A obtains the authentication code transmitted from deliverer terminal 3A. Based on the authentication code obtained through communication device 25A and the authentication code already obtained in Step 70, processor 16A of vehicle 2A determines whether or not authentication is established (Step 88).

When processor 40A determines that the authentication is established (Yes in Step 88), processor 40A unlocks outer door 18 (Step 89). When outer door 18A is opened, deliverer 9 can put delivery item W in cooling box 21.

Further, in Step 82 above, the storage information of delivery item W is included in deliverer terminal 3 and stores the storage type. Accordingly, each delivery item W can be accommodated in refrigerator compartment 14A or freezer compartment 15A based on the storage type.

According to delivery system 1 described above, even if user 8 designates vehicle 2B as the destination for delivery item W but then mistakenly moves using vehicle 2B, user 8 can change the destination to vehicle 2A, whereby redelivery by deliverer 9 or 10 can be suppressed.

Further, when each of vehicles 2A, 2B is used during the delivery time period by the vehicle user, each of vehicles 2A, 2B notifies a warning to the vehicle user. Accordingly, for example, when the vehicle user is user 8, user 8 can change the delivery destination on that occasion, whereby occurrence of redelivery can be suppressed.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A delivery system comprising:
   a first vehicle including a first delivery box;
   a second vehicle including a second delivery box;
   a user terminal configured to be operated by a user;
   a deliverer terminal used by a deliverer during delivery; and
   a server configured to communicate with the first vehicle, the second vehicle, the user terminal, and the deliverer terminal, wherein
      when the server receives a change signal from the user terminal to change a delivery destination for a delivery item from the first vehicle to the second vehicle, the server is configured to transmit required information to the deliverer terminal, the required information being required for the deliverer to deliver the delivery item to the second vehicle, the second delivery box is a cooling box, the second vehicle further includes a controller configured to control the cooling box, when the server receives the change signal, the server is configured to transmit storage information and delivery time period information to the second vehicle, the storage information indicating a storage environment of the delivery item, and the delivery time period information indicating a delivery time period, and when the second vehicle obtains the storage information and the delivery time period information, the controller of the second vehicle is further configured to operate the cooling box to bring an internal environment of the cooling box into the storage environment in the delivery time period, wherein the second delivery box further includes:
a refrigerator compartment,
a first temperature sensor that measures a temperature in the refrigerator compartment,
a first cooling pipe for supplying the refrigerator compartment with air cooled, and
a first damper rotatably disposed at the first cooling pipe, and wherein the controller of the second vehicle is configured to:
set a target value of the internal temperature of the refrigerator compartment based on the storage information,
calculate a first differential temperature, which is a difference between the target value of the internal temperature of the refrigerator compartment and the internal temperature of the refrigerator compartment measured by the first temperature sensor,
calculate a first differential time of the delivery time period from current time based on the delivery time period information, and
set an opening degree of the first damper based on the first differential temperature and the first differential time.

2. The delivery system according to claim 1, wherein the required information includes position information of the second vehicle.

3. The delivery system according to claim 1, wherein the second vehicle includes a locking device configured to switch between (i) a state in which the delivery item is able to be accommodated in the second delivery box and (ii) a state in which the delivery item is not able to be accommodated in the second delivery box, when a predetermined authentication code is provided from the deliverer terminal, the locking device is brought into the state in which the delivery item is able to be accommodated in the second delivery box, and the required information includes the predetermined authentication code.

4. The delivery system according to claim 1, wherein the second delivery box further includes:
a freezer compartment,
a second temperature sensor that measures a temperature in the freezer compartment,
a second cooling pipe for supplying the freezer compartment with air cooled, and
a second damper rotatably disposed at the second cooling pipe, and the controller of the second vehicle is configured to:

set a target value of the internal temperature of the freezer compartment based on the storage information,
calculate a second differential temperature, which is a difference between the target value of the internal temperature of the freezer compartment and the internal temperature of the freezer compartment measured by the second temperature sensor,
calculate a second differential time of the delivery time period from current time based on the delivery time period information, and
set an opening degree of the second damper based on the second differential temperature and the second differential time.

5. The delivery system according to claim 4, wherein the storage information includes a storage temperature and a storage type of each delivery item, the controller of the second vehicle is configured to classify delivery items into delivery items for which storage type indicates necessity of refrigeration and delivery items for which storage type indicates necessity of freezing, based on the storage information, the controller of the second vehicle is configured to set the lowest storage temperature among the storage temperatures of delivery items for which storage types indicate the necessity of refrigeration as the target value of the internal temperature of the refrigerator compartment, and the controller of the second vehicle is configured to set the lowest storage temperature among the storage temperatures of delivery items for which storage types indicate the necessity of freezing as the target value of the internal temperature of the freezer compartment.

6. The delivery system according to claim 1, wherein when the second vehicle obtains the delivery time period information, the controller of the second vehicle is configured to perform a movement detection control, the movement detection control being a control for notifying a warning to a user of the second vehicle when the second vehicle moves during the delivery time period.

7. The delivery system according to claim 1, wherein the first delivery box is a cooling box, the first vehicle further includes a controller configured to perform internal temperature control of the first delivery box, when the server receives the change signal, the server is configured to transmit a cancellation signal to the first vehicle, and when the first vehicle receives the cancellation signal, the first vehicle is configured to end the internal temperature control.

8. The delivery system according to claim 7, wherein the first vehicle further includes an outer door and a locking device configured to lock the outer door, when the server obtains request information including a vehicle ID of the first vehicle, the server is configured to transmit, to the deliverer terminal, a predetermined authentication code for unlocking the locking device of the first vehicle, the controller of the first vehicle is configured to unlock the outer door by using the predetermined authentication code, and when the first vehicle receives the cancellation signal, the controller of the first vehicle is configured to invalidate the predetermined authentication code.

* * * * *